US012560197B2

(12) United States Patent

Lee

(10) Patent No.:     US 12,560,197 B2

(45) Date of Patent:      Feb. 24, 2026

(54) UNIVERSAL JOINT

(71) Applicant: TIEN-I INDUSTRIAL CO., LTD.,
Taichung (TW)

(72) Inventor: Larry Lee, Taichung (TW)

(73) Assignee: TIEN-I INDUSTRIAL CO., LTD.,
Taichung (TW)

( * ) Notice: Subject to any disclaimer, the term of this
patent is extended or adjusted under 35
U.S.C. 154(b) by 273 days.

(21) Appl. No.: 18/482,106

(22) Filed: Oct. 6, 2023

(65) Prior Publication Data

US 2024/0025021 A1      Jan. 25, 2024

Related U.S. Application Data

(63) Continuation-in-part of application No. 17/474,701,
filed on Sep. 14, 2021, now abandoned.

(51) Int. Cl.
*F16C 11/06*          (2006.01)
*B25B 23/00*         (2006.01)

(52) U.S. Cl.
CPC ...... *F16C 11/0652* (2013.01); *B25B 23/0007*
(2013.01); *Y10T 403/32639* (2015.01); *Y10T*
*403/32811* (2015.01)

(58) Field of Classification Search
CPC ............ B25B 23/0007; B25B 23/0014; B25B
23/0028; F16C 11/0609; F16C 11/0623;
(Continued)

(56) References Cited

U.S. PATENT DOCUMENTS 2,618,049 A     11/1952  Flumerfelt
2,687,024 A      8/1954  George
(Continued)

FOREIGN PATENT DOCUMENTS

DE            928987 C      6/1957
DE      102008032794 A1      1/2010
(Continued)

OTHER PUBLICATIONS

Kleditzsch et al. Steel-aluminum Knurled Interference Fits: Joining
Process and Load Characteristics. Procedia Engineering, vol. 81,
2014, pp. 1987-1987 [online], [retrieved on Feb. 3, 2023]. Retreived
from the internet <URL:https://www.sciencedirect.com/science/
article/pii/S1877705814015471>.

(Continued)

*Primary Examiner* — Amber R Anderson
*Assistant Examiner* — Kevin J Baynes
(74) *Attorney, Agent, or Firm* — MUNCY, GEISSLER,
OLDS & LOWE, P.C.

(57)          ABSTRACT

A universal joint is provided, including: a seat, including a
receiving room extending in an axial direction and at least
one through hole in communication with the receiving room;
a connecting member, including a ball head rotatably
received within the receiving room; and an assembling
mechanism, including at least one blocking member and a
sleeve member sleeved around the seat, the at least one
blocking member being received within the at least one
through hole and blockable with the ball head in the axial
direction, the sleeve member covering the at least one
through hole; wherein the seat has a first hardness, the sleeve
member has a second hardness smaller than the first hard-
ness, an outer circumferential wall of the seat is partially
embedded within an inner circumferential wall of the sleeve
member.

10 Claims, 10 Drawing Sheets

(58) Field of Classification Search

CPC .............. F16C 11/0647; F16C 11/0652; F16C 11/0661; F16C 11/069; F16C 11/106; F16D 3/20; F16D 3/2052; Y10T 403/32639; Y10T 403/32647; Y10T 403/32713; Y10T 403/32811

See application file for complete search history.

(56) References Cited

U.S. PATENT DOCUMENTS

| | | | | |
|---|---|---|---|---|
| 3,337,247 | A * | 8/1967 | Moskovitz | F16C 11/0604 |
| | | | | 403/138 |
| 3,613,201 | A * | 10/1971 | Herbenar | F16C 11/0676 |
| | | | | 403/126 |
| 3,850,443 | A | 11/1974 | Hassan | |
| 4,114,401 | A | 9/1978 | Van Hoose | |
| 4,256,413 | A | 3/1981 | Abe | |
| 4,492,130 | A | 1/1985 | Lamy | |
| 4,564,307 | A | 1/1986 | Ito | |
| 4,936,701 | A | 6/1990 | Allen | |
| 4,986,688 | A | 1/1991 | Tuan | |
| 5,028,163 | A | 7/1991 | Krieg | |
| 5,503,494 | A * | 4/1996 | Kamata | F16D 1/0858 |
| | | | | 403/359.6 |
| 6,082,721 | A | 7/2000 | Kingsley | |
| 6,092,968 | A * | 7/2000 | Lanham | F16B 37/14 |
| | | | | 411/405 |
| 6,145,416 | A | 11/2000 | Bonniot | |
| 6,164,861 | A | 12/2000 | Maughan | |
| 6,347,564 | B1 | 2/2002 | Ciocca | |
| 6,505,989 | B1 * | 1/2003 | Pazdirek | F16C 11/0638 |
| | | | | 403/135 |
| 6,554,525 | B1 * | 4/2003 | Heidemann | F16C 11/0638 |
| | | | | 403/140 |
| 6,739,222 | B2 * | 5/2004 | Hsieh | B25B 13/06 |
| | | | | 81/60 |
| 6,821,047 | B2 * | 11/2004 | Broker | F16C 11/0685 |
| | | | | 403/138 |
| 7,073,970 | B2 * | 7/2006 | Gercke | B21K 1/762 |
| | | | | 403/132 |
| 7,080,539 | B2 | 7/2006 | Parker | |
| 7,644,500 | B2 * | 1/2010 | Schmidt | F16C 11/0685 |
| | | | | 29/898.044 |
| 7,972,078 | B2 * | 7/2011 | Igarashi | F16D 1/101 |
| | | | | 403/359.1 |
| 8,001,873 | B2 | 8/2011 | Peng | |
| 8,043,023 | B2 * | 10/2011 | Igarashi | F16D 1/101 |
| | | | | 403/359.1 |
| 8,104,382 | B2 | 1/2012 | Hu | |
| 8,192,103 | B2 | 6/2012 | Tsai | |
| 8,403,763 | B2 | 3/2013 | Hu | |
| 8,747,011 | B2 * | 6/2014 | Behre | F16C 11/0633 |
| | | | | 403/135 |
| 8,783,702 | B2 * | 7/2014 | Lee | B60G 7/005 |
| | | | | 403/135 |
| 8,783,996 | B2 * | 7/2014 | Kenawy | F16D 1/101 |
| | | | | 403/359.1 |
| 8,956,236 | B2 * | 2/2015 | Chu | B25B 13/06 |
| | | | | 81/177.75 |
| 9,074,637 | B2 * | 7/2015 | Slayne | F16D 1/0835 |
| 9,093,419 | B2 * | 7/2015 | Hong | H10D 1/68 |
| 9,205,543 | B1 * | 12/2015 | Chen | B25B 13/06 |
| 9,446,644 | B2 | 9/2016 | Wilcutt | |
| 9,546,679 | B2 | 1/2017 | Sato | |
| 10,167,894 | B2 | 1/2019 | James | |
| 10,343,269 | B2 | 7/2019 | Nino | |
| 10,371,195 | B2 * | 8/2019 | Parker | F16C 11/0685 |
| 10,919,132 | B2 * | 2/2021 | Huang | B25B 23/0028 |
| 11,346,402 | B2 | 5/2022 | Tsai | |
| 11,441,597 | B2 | 9/2022 | Parker | |
| 11,467,528 | B2 | 10/2022 | Yu | |
| 2005/0063769 | A1 | 3/2005 | Holmes | |
| 2006/0089202 | A1 | 4/2006 | Losi, Jr. | |
| 2006/0140711 | A1 * | 6/2006 | Morales Arnaez | |
| | | | | F16C 11/0638 |
| | | | | 403/122 |
| 2008/0193205 | A1 | 8/2008 | Peng | |
| 2010/0004064 | A1 | 1/2010 | Hu | |
| 2011/0033227 | A1 * | 2/2011 | Kwon | B29C 45/14491 |
| | | | | 403/135 |
| 2011/0179915 | A1 | 7/2011 | Peng | |
| 2012/0321374 | A1 | 12/2012 | Ray | |
| 2016/0327077 | A1 | 11/2016 | Huang | |
| 2017/0254365 | A1 | 9/2017 | Chen | |
| 2019/0293112 | A1 | 9/2019 | Tsai | |
| 2020/0237389 | A1 | 7/2020 | Wills | |
| 2022/0186772 | A1 * | 6/2022 | Lettmann | F16C 11/0609 |

FOREIGN PATENT DOCUMENTS

| | | | | |
|---|---|---|---|---|
| DE | 202016101426 U1 * | 6/2016 | ........ | B25B 23/0014 |
| JP | 3269962 B2 | 4/2002 | | |
| WO | WO-2010037504 A1 * | 4/2010 | ......... | F16C 11/0609 |
| WO | WO-2019035395 A1 * | 2/2019 | ............... | F16D 3/20 |

OTHER PUBLICATIONS

What are the different types of sheet metal? by McAlpin Industries, Oct. 20, 2020, [online], [retreived on Mar. 2, 2023] Retreived from the internet <URL:https://www.mcalpin-ind.com/article.cfm?ArticleNumber=15#:~:text=Grade%20304%20is%20the%20most, resistance%20but%20is%20heat%20treatable>.

* cited by examiner

10a

32a

20c

UNIVERSAL JOINT

The present invention is a CIP of application Ser. No. 17/474,701, filed Sep. 14, 2021, the entire contents of which are hereby incorporated by reference.

BACKGROUND OF THE INVENTION

Field of the Invention

In locking operation, if the working space is narrow, a tool with a swingable universal joint is often used for easy operation. The conventional universal joint includes a seat with a receiving room and a connection member with a ball head, and the ball head is restrictedly received within the receiving room by a locking structure such as a pin, a plurality of steel balls or fasteners.

Description of the Prior Art

However, the aforementioned structural configuration causes the conventional universal joint have problems such as complex processing methods, costly and poor assembly stability, and it is prone to collisions during operation and non-smooth movement. In addition, the seat and the connection member are hard to additionally proceed with surface processing such as bossing, engraving or the like because of their high material hardness.

The present invention is, therefore, arisen to obviate or at least mitigate the above-mentioned disadvantages.

SUMMARY OF THE INVENTION

The main object of the present invention is to provide a universal joint which has a simple structure and stable and reliable combination.

To achieve the above and other objects, a universal joint is provided, including: a seat, including a receiving room extending in an axial direction and at least one through hole in communication with the receiving room; a connecting member, including a ball head rotatably received within the receiving room; and an assembling mechanism, including at least one blocking member and a sleeve member sleeved around the seat, the at least one blocking member being received within the at least one through hole and blockable with the ball head in the axial direction, the sleeve member covering the at least one through hole; wherein the seat has a first hardness, the sleeve member has a second hardness smaller than the first hardness, an outer circumferential wall of the seat is partially embedded within an inner circumferential wall of the sleeve member. The outer circumferential wall of the seat includes an outer surface and a plurality of projections protruding beyond the outer surface. As viewed in a direction lateral to the axial direction, at least one of the plurality of projections has different heights relative to the outer surface.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
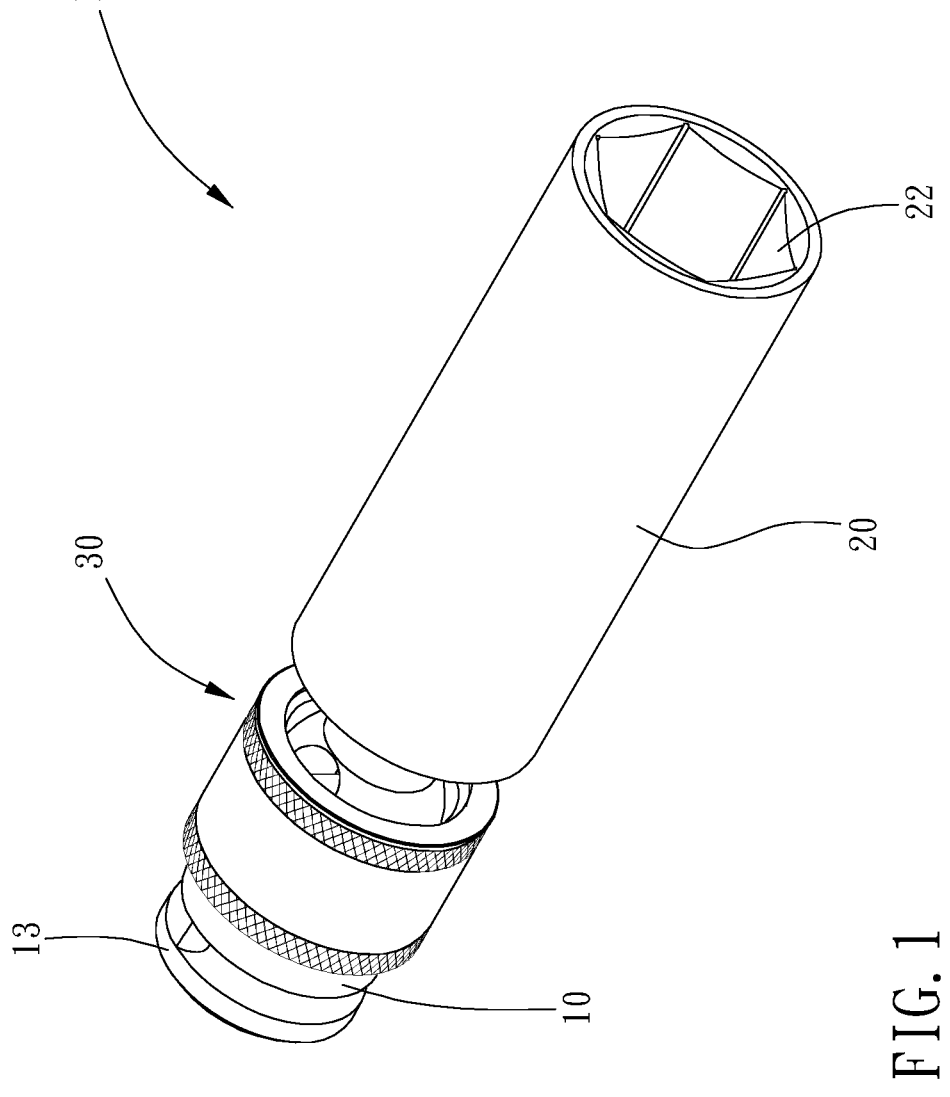
FIG. 1 is a stereogram of a first preferable embodiment of the present invention.
Figure 2:
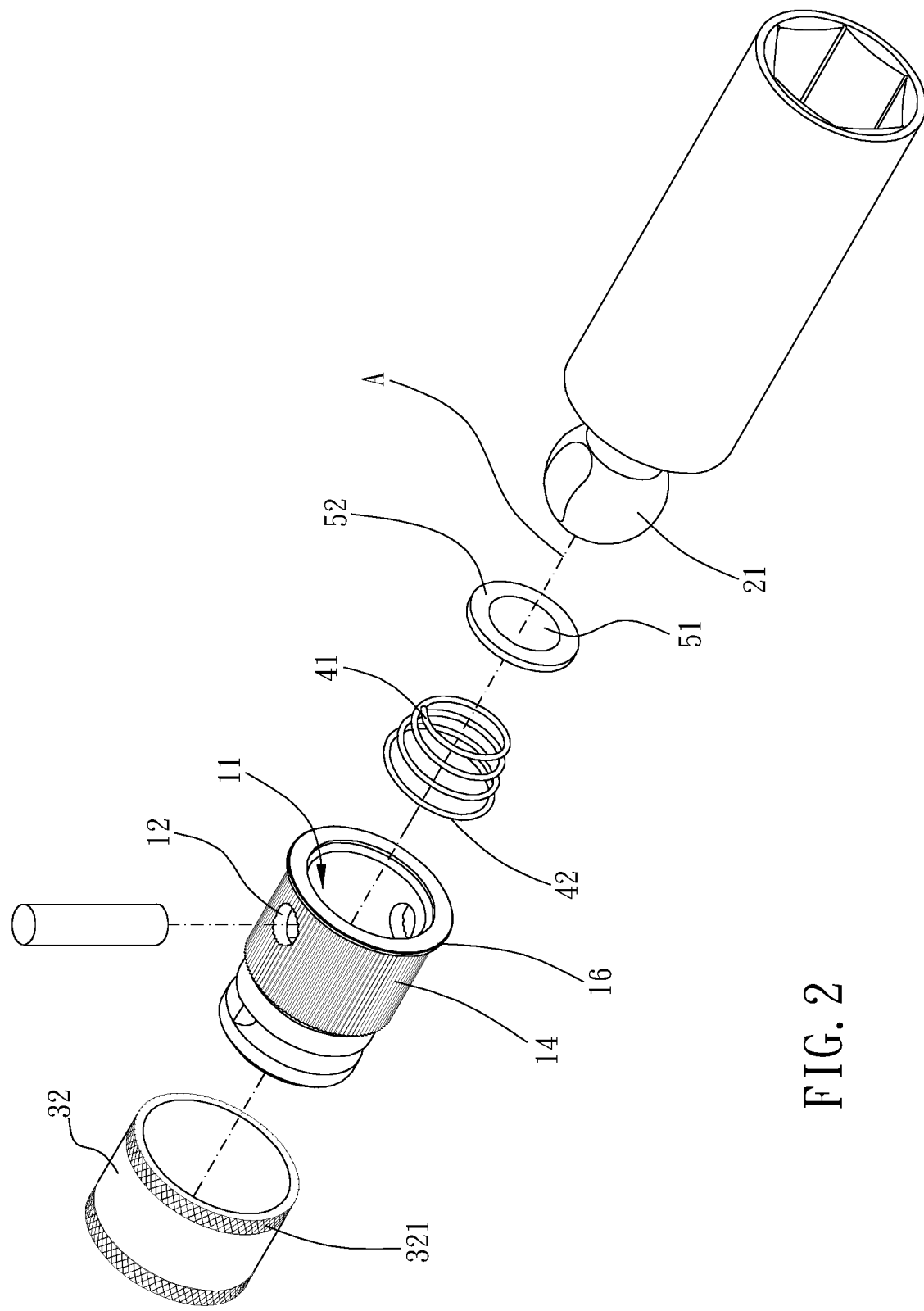
FIG. 2 is a breakdown drawing of the first preferable embodiment of the present invention.
Figure 3:
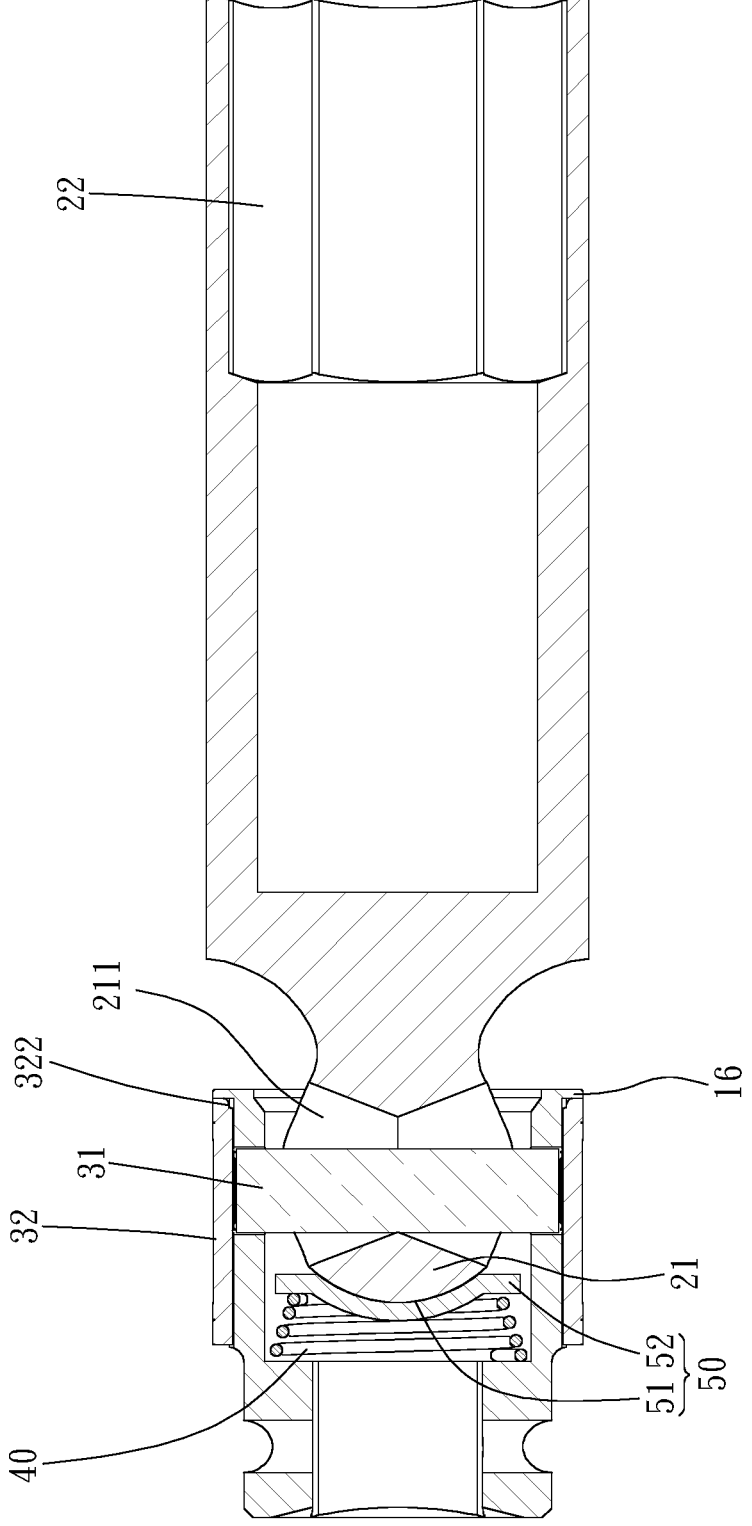
FIG. 3 is a cross-sectional view of the first preferable embodiment of the present invention.
Figure 4:
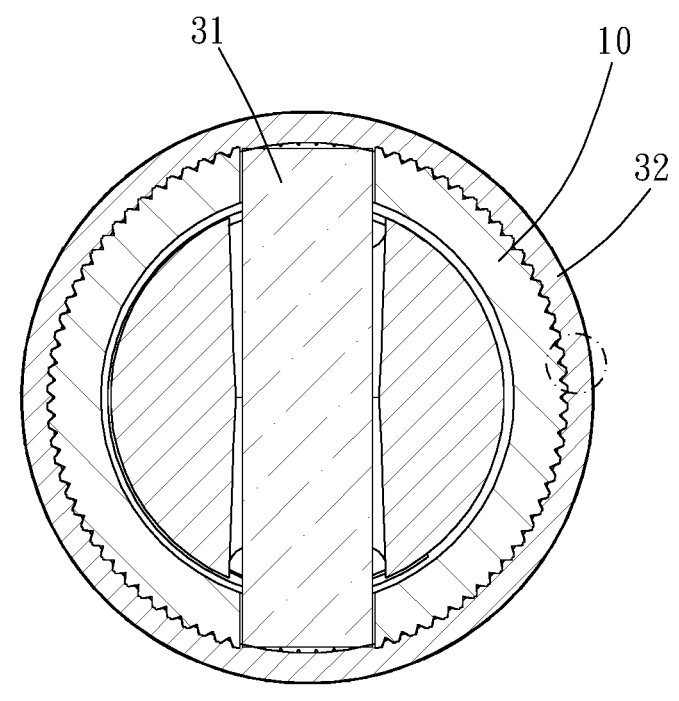
FIG. 4 is another cross-sectional view of the first preferable embodiment of the present invention.

Please refer to FIGS. 1 to 9 for a preferable embodiment of the present invention. A universal joint 1 of the present invention includes a seat 10, a connecting member 20 and an assembling mechanism 30.

The seat 10 includes a receiving room 11 extending in an axial direction A and at least one through hole 12 in communication with the receiving room 11. The connecting member 20 includes a ball head 21 rotatably received within the receiving room 11. The assembling mechanism 30 includes at least one blocking member 31 and a sleeve member 32 sleeved around the seat 10, the at least one blocking member 31 is received within the at least one through hole 12 and blockable with the ball head 21 in the axial direction A, and the sleeve member 32 covers the at least one through hole 12. The seat 10 has a first hardness, and the sleeve member 32 has a second hardness smaller than the first hardness. An outer circumferential wall of the seat 10 is partially embedded within an inner circumferential wall of the sleeve member 32 so that the inner circumferential wall of the sleeve member 32 can be pressed to deform relative to the outer circumferential wall of the seat 10, and thus it has a simple structure and stable and reliable combination.

Figure 10:
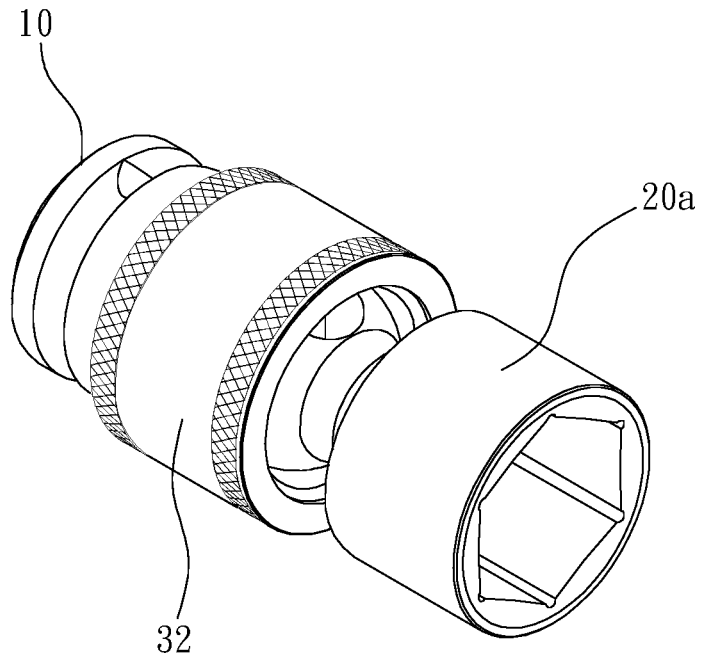
FIG. 10 is a stereogram of a second preferable embodiment of the present invention.
Figure 11:
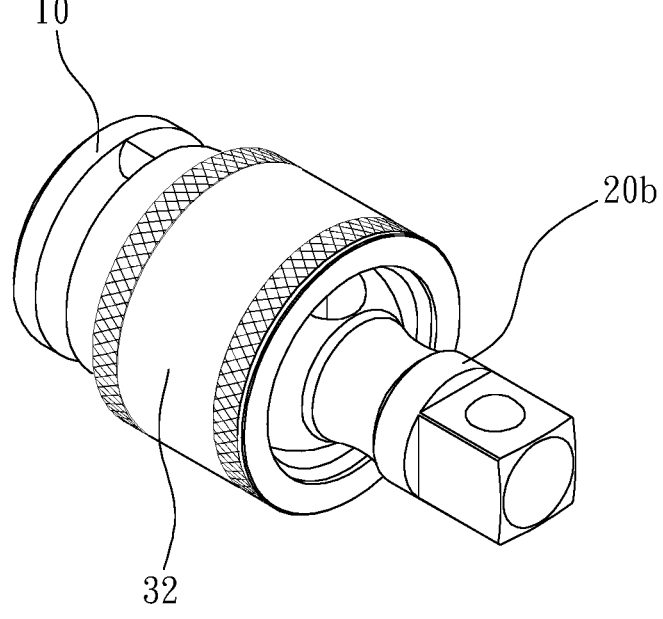
FIG. 11 is a stereogram of a third preferable embodiment of the present invention.
Figure 12:
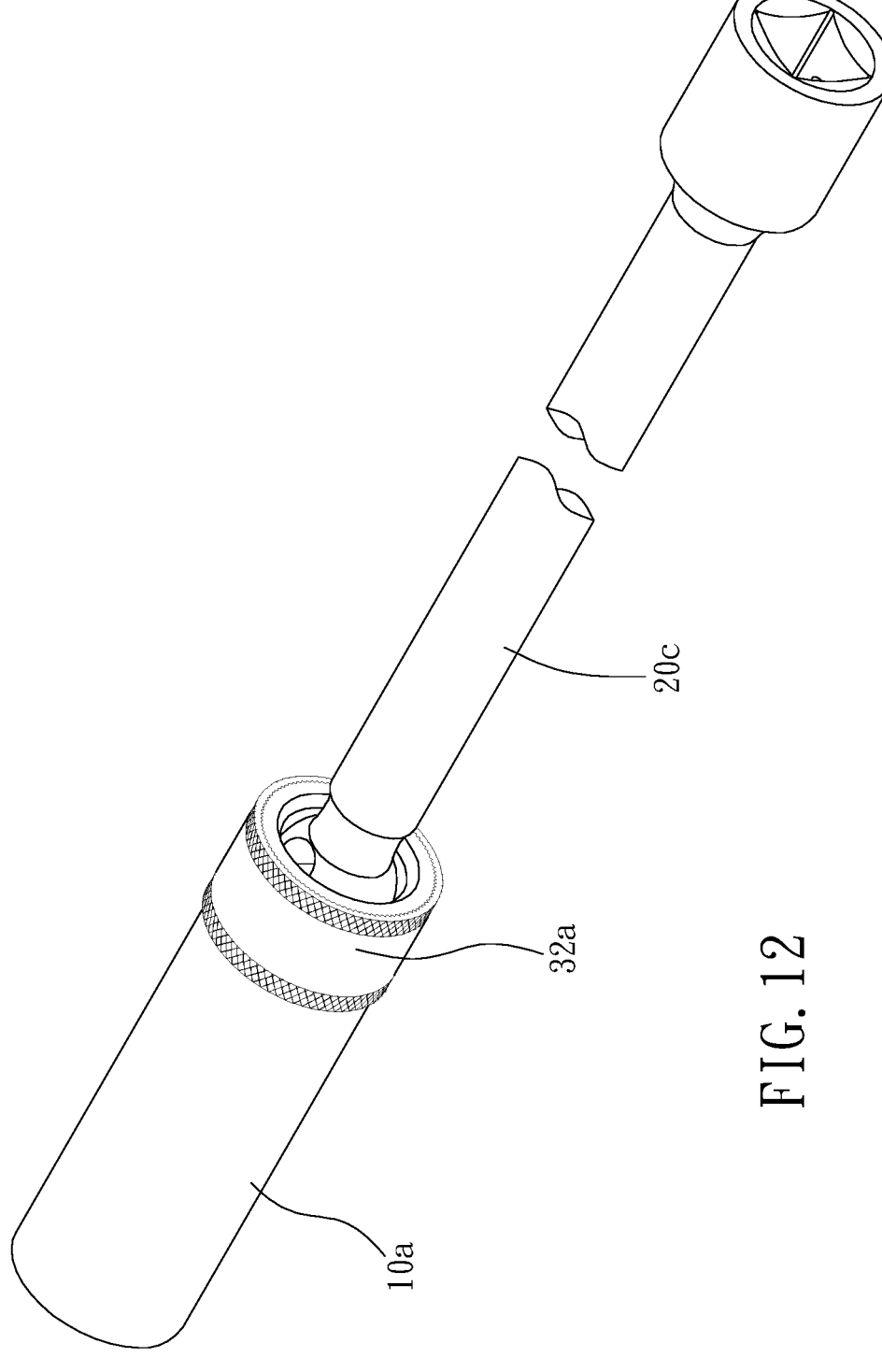
FIG. 12 is a stereogram of a fourth preferable embodiment of the present invention.

The seat 10 and the connecting member 20 are configured to be connected with a driving tool (such as wrench, screwdriver or the like) and a driven member (such as socket, screw or the like), respectively. In this embodiment, an end of the seat 10 includes the receiving room 11, another end of the seat 10 includes an assembling portion 13, and the assembling portion 13 is configured to be connected with a head portion of a driving tool; the connecting member 20 is a socket, and end of the socket includes the ball head 21, and another end of the socket includes a sleeving hole 22 which is polygonal configured to be connected with a polygonal head of a workpiece; the length of the socket may be adjustable, for example, in a second preferable embodiment as shown in FIG. 10, the connecting member 20a is a socket which is relatively shorter. Specifically, the seat 10 includes two said through holes 12 oppositely arranged, and the ball head 21 includes a penetrating hole 211 oppositely expanding radially; the at least one blocking member 31 is a pin, and the pin is disposed through the two said through holes 12 and the penetrating hole 211, so that it has a simple structure and is easy to assemble. In other embodiment, an end of the connecting member 20*b* may include a polygonal head, as shown in FIG. 11; the seat 10*a* may be a socket, the connecting member 20*c* may be a connecting rod, as shown in FIG. 12, for providing large range for operation; the at least one blocking member may include a plurality of projections disposed on the ball head or the like.

A difference of an outer diametric dimension of the seat 10 and an inner diametric dimension of the sleeve member 32 is 0.01 mm to 1.00 mm (preferably 0.05 mm to 0.15 mm), and thus the seat 10 and the sleeve member 32 can sufficiently engage radially with each other so that it can prevent disengagement.

Figure 5:
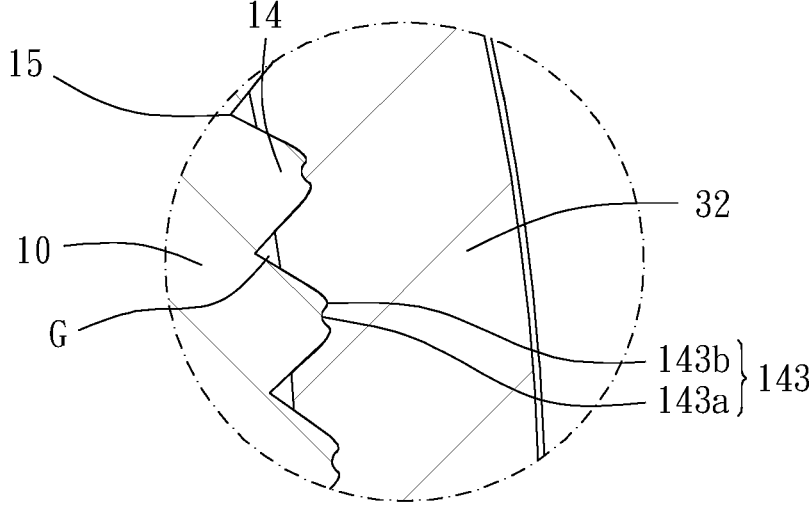
FIG. 5 is a partial enlargement of FIG. 4.
Figure 6:
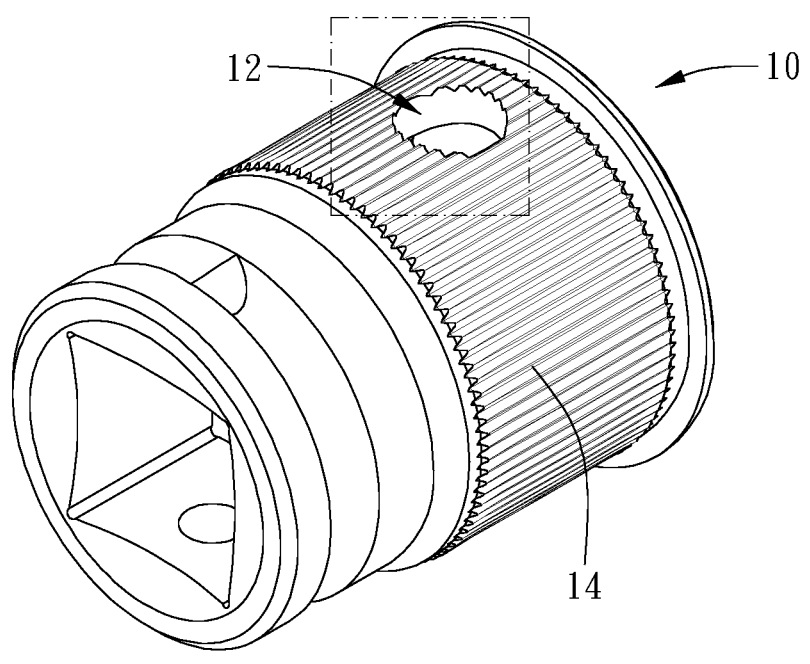
FIG. 6 is a stereogram of a seat according to the first preferable embodiment of the present invention.
Figure 7:
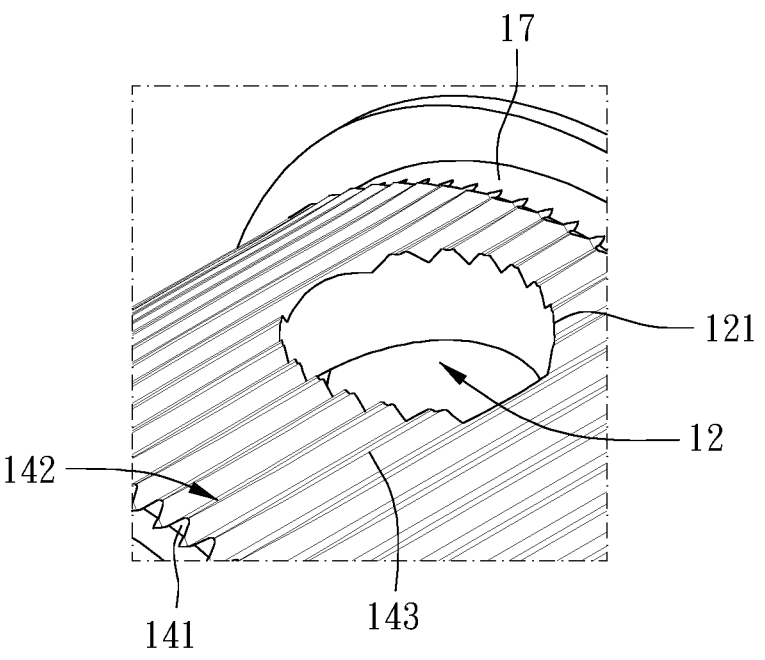
FIG. 7 is a partial enlargement of FIG. 6.
Figure 8:
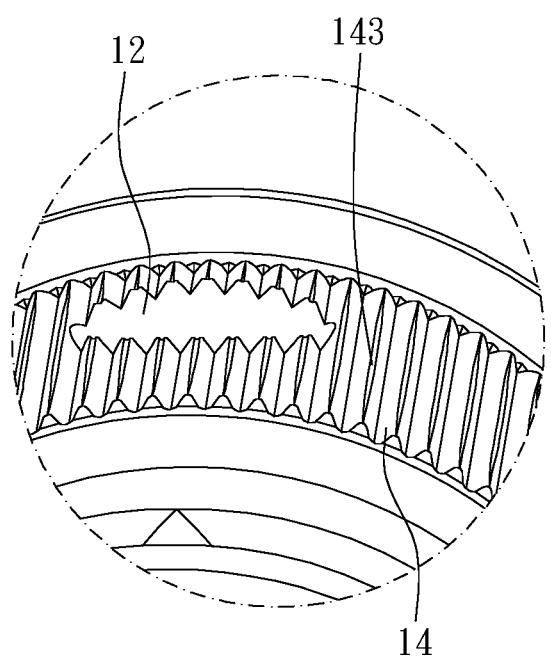
FIG. 8 is a partial enlargement of the seat according to the first preferable embodiment of the present invention.
Figure 9:
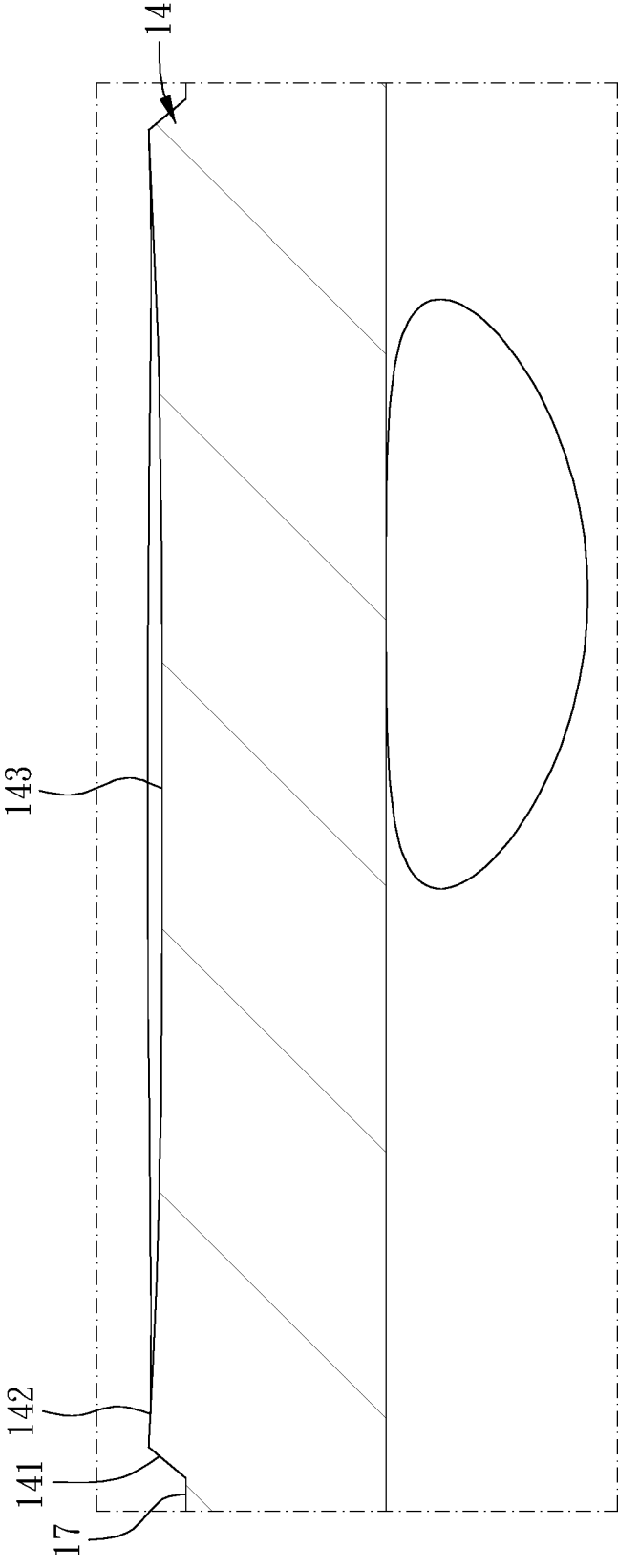
FIG. 9 is a partial enlarged cross-sectional view of the seat according to the first preferable embodiment of the present invention.

Preferably, the outer circumferential wall of the seat 10 includes an outer surface 17 and a plurality of projections 14 circumferentially arranged and protruding beyond the outer surface 17, and as viewed in a direction lateral to the axial direction A, at least one of the plurality of projections 14 has different heights relative to the outer surface 17, as shown in FIGS. 7-9. Specifically, each of the plurality of projections 14 extends in the axial direction A, and two end surfaces 141 of each of the plurality of projections 14 are inclined to the axial direction A so as to provide guiding effect during assembling. In this embodiment, each of the plurality of projections 14 is tapered radially and has a tip portion 142, and at least one of said tip portions 142 has a notched portion 143 extending in the axial direction A. A width of each said notched portion 143 is gradually decreased toward two ends of one of the plurality of projections 14, and a depth of each said notched portion 143 is gradually decreased toward two ends of one of the plurality of projections 14. As viewed in the axial direction A, each said notched portion 143 includes a middle portion 143*a* and two side portions 143*b* located at two opposite sides of the middle portion 143*a*, and the two side portions 143*b* protrude beyond the middle portion 143*a*, as shown in FIG. 5. Therefore, the two side portions 143*b* of each said notched portion 143 and two ends of each said tip portion 142 are stably engaged within the sleeve member 32, and the inner circumferential wall of the seat 10 can sufficiently engage with the sleeve member 32 and cannot be affected by the crump from the sleeve member 32.

Every adjacent two of the plurality of projections 14 define a recession 15, and each said recession 15 and the sleeve member 32 define a gap G therebetween, which facilitates assembling. A distance with which each of the plurality of projections 14 is embedded radially within the sleeve member 32 is smaller than or equal to one half a thickness of the inner circumferential wall of the sleeve member 32, which prevents deformation of the sleeve member 32. In this embodiment, the two said through holes 12 are disposed through a part of the plurality of projections 14 and a part of said recessions 15, and an end opening of each of the two said through holes 12 is defined by an unsmooth edge 121, which reduces friction force during assembling. Preferably, as viewed in the axial direction A, the gap G has a radial dimension smaller than two third the depth of the recession 15 so that the sleeve member 32 is non-rotatable relative to the seat 10, and thus it is stable. Preferably, the seat 10 further includes a blocking portion 16 connected to ends of the plurality of projections 14 and projecting radially, and an end face of the sleeve member 32 is abutted axially against the blocking portion 16, so as to provide positioning effect in assembling. In other embodiments, there may be no gap between the seat and the sleeve member; each of the plurality of projections may be a rib including a cut flat surface, arcuate surface or conical surface. The plurality of projections 14 are relatively higher than the recessions 15 and can be embedded within the sleeve member 32.

An outer circumferential wall of the sleeve member 32 includes at least one embossing portion 321, thus being good for grip and appearance. The density of the seat 10 is greater than the density of the sleeve member 32, so that the seat 10 is good in structural strength and wearing-proof, and so that the sleeve member 32 is easy to be processed. In this embodiment, the seat 10 is made of steel and has high structural strength; the sleeve member 32 is made of steel aluminum alloy, has light weight and high corrosion resistance, and is easy to be processed. Preferably, the inner circumferential wall of the sleeve member 32 includes a guiding portion 322 adjacent to an opening of the sleeve member 32, the guiding portion 322 may be a inclined face, curved face or stepped face, which facilitates assembling and alignment. In assembling, the guiding portion 322 is abutted on an end of the seat 10, and the sleeve member 32 is then sleeved around the seat 10 by pressing a side of the sleeve member 32 opposite to the guiding portion 322 toward the seat 10. The universal joint has a simple structure, is easy to manufacture and assemble, and is of low cost. It is noted that the seat and the sleeve member may be made of other materials.

Specifically, the universal joint 1 further includes an elastic member 40 and an abutting member 50 which are received in the receiving room 11, the elastic member 40 is axially abutted against and between the abutting member 50 and an inner wall of the receiving room 11, and the abutting member 50 includes a concave surface 51 abutted against the ball head 21. The elastic member 40 axially biases the abutting member 50 together with the connecting member 20 toward the receiving room 11, and the abutting member 50 can stably abut against the ball head 21. In this embodiment, the ball head 21 a ball head which is generally round, and the concave surface 51 extends arcedly, so that the ball head 21 can rotate smoothly; the abutting member 50 has an outer diametric dimension smaller than an inner diametric dimension of the receiving room 11 and larger than or equal to one half the inner diametric dimension of the receiving room 11, so that when the ball head 21 swings, the abutting member is smoothly swingable relative to the axial direction A; the abutting member is made of steel, which is uneasy to deform and durable. Specifically, the elastic member 40 is a conical spring, a small-diameter end 41 of the conical spring is abutted against the abutting member 50, and a large-diameter end 42 of the conical spring is abutted against the inner wall of the receiving room 11; the abutting member 50 further includes an annular wall 52 extending radially from a periphery of the concave surface 51, and the elastic member 40 is at least partially abutted against the annular wall 52, thus preventing disengagement and improving stability.

A method for assembling the universal joint 1 is further provided. The method includes following steps of: providing the seat 10 and the connecting member 20; rolling the seat 10 to form the plurality of projections 14 on its outer circumferential; disposing the ball head 21 into the receiving room 11; disposing the at least one blocking member 31 through the at least one through hole 12 in a manner of being blockable with the ball head 21; and disposing the sleeve member 32 around the seat 10 in a manner of covering the at least one through hole 12 and in a manner that the plurality of projections 14 are partially embedded within an inner circumferential wall of the sleeve member 32. The method for assembling the universal joint 1 includes simple steps and is easy to carry out.

Figure 13:
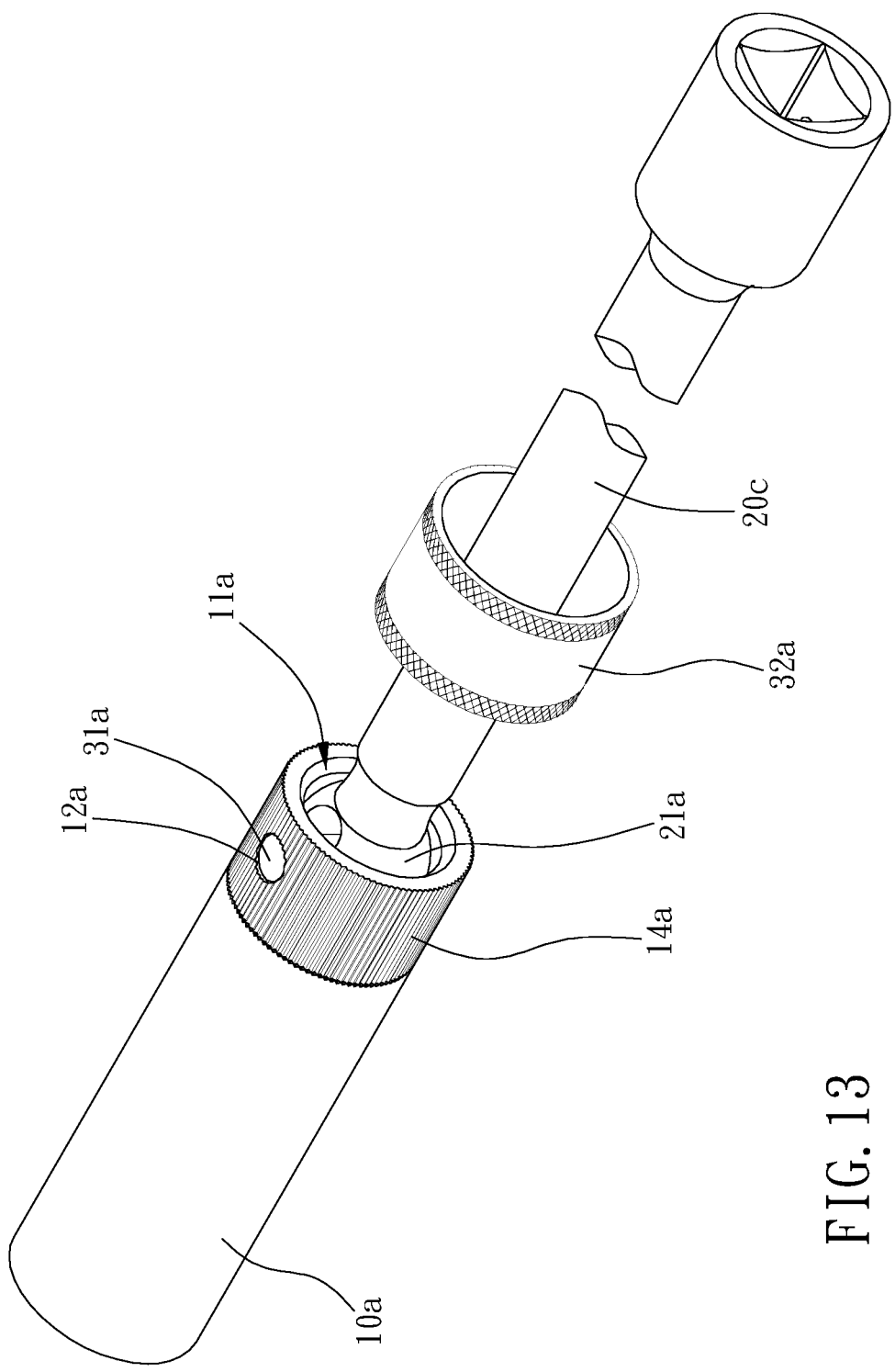
FIG. 13 is a drawing showing assembling of the fourth preferable embodiment of the present invention.

Optionally, the abutting member 50 may be disposed between the elastic member 40 and the ball head 21. In this embodiment, the assembling portion 13 has an outer diametric dimension smaller than an outer diametric dimension of a portion of the seat 10 where the plurality of projections 14 are arranged; after the blocking member 31 is disposed through the sleeve member 32, an end of the seat 10 provided with the assembling portion 13 is received within the sleeve member 32 and the plurality of projections 14 are embeddedly engaged into the sleeve member 32. As shown in FIGS. 12 and 13, as an end of the seat remote from the receiving room 11a or an end of the connecting member 20a remote from the ball head 21a has an outer diametric dimension larger than an inner diametric dimension of the sleeve member 32a, the sleeve member 32a may be sleeved around the connecting member 20c before the ball head 21a is received in the receiving room 11a (as shown in FIG. 13), the blocking member 31a is then disposed through the through hole 12a and the ball head 21a, and the sleeve member 32a is engaged with the projections 14a and covers the through hole 12a, which is easy to assemble. However, the sleeve member may be sleeved to the seat from an end of the connecting member remote from the ball head.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A universal joint, including:
a seat, including a receiving room extending in an axial direction and at least one through hole in communication with the receiving room;
a connecting member, including a ball head rotatably received within the receiving room; and
an assembling mechanism, including at least one blocking member and a sleeve member sleeved around the seat, the at least one blocking member being received within the at least one through hole and blockable with the ball head in the axial direction, the sleeve member covering the at least one through hole;
wherein the seat has a first hardness, the sleeve member has a second hardness smaller than the first hardness, an outer circumferential wall of the seat is partially embedded within an inner circumferential wall of the sleeve member;
wherein the outer circumferential wall of the seat includes an outer surface and a plurality of projections circumferentially arranged and protruding beyond the outer surface, as viewed in a direction lateral to the axial direction, at least one of the plurality of projections has different heights relative to the outer surface;
wherein each of the plurality of projections is tapered radially and has a tip portion, and at least one of said tip portions has a notched portion extending in the axial direction;
wherein a width of each said notched portion is gradually decreased toward two ends of one of the plurality of projections.

2. The universal joint of claim 1, wherein each of the plurality of projections extends in the axial direction, and two end surfaces of each of the plurality of projections are inclined to the axial direction.

3. The universal joint of claim 1, wherein a depth of each said notched portion is gradually decreased toward two ends of one of the plurality of projections.

4. The universal joint of claim 1, wherein as viewed in the axial direction, each said notched portion includes a middle portion and two side portions located at two opposite sides of the middle portion, and the two side portions protrude beyond the middle portion.

5. The universal joint of claim 1, wherein every adjacent two of the plurality of projections define a recession therebetween, and each said recession and the sleeve member define a gap therebetween.

6. The universal joint of claim 1, wherein a distance with which each of the plurality of projections is embedded radially within the sleeve member is smaller than or equal to one half a thickness of the inner circumferential wall of the sleeve member.

7. The universal joint of claim 1, wherein a difference of an outer diametric dimension of the seat and an inner diametric dimension of the sleeve member is 0.01 mm to 1.00 mm.

8. The universal joint of claim 1, further including an elastic member and an abutting member which are received in the receiving room, wherein the elastic member is axially abutted against and between the abutting member and an inner wall of the receiving room, and the abutting member includes a concave surface abutted against the ball head.

9. The universal joint of claim 8, wherein the abutting member has an outer diametric dimension smaller than an inner diametric dimension of the receiving room.

10. The universal joint of claim 9, wherein the outer diametric dimension of the abutting member is larger than or equal to one half the inner diametric dimension of the receiving room; the concave surface is an arced surface; the abutting member further includes an annular wall extending radially from a periphery of the concave surface, the elastic member is at least partially abutted against the annular wall; the abutting member is made of steel; the elastic member is a conical spring, a small-diameter end of the conical spring is abutted against the abutting member, a large-diameter end of the conical spring is abutted against the inner wall of the receiving room;
wherein each of the plurality of projections extends in the axial direction, and two end surfaces of each of the plurality of projections are inclined to the axial direction; wherein a depth of each said notched portion is gradually decreased toward two ends of one of the plurality of projections;
wherein as viewed in the axial direction, each said notched portion includes a middle portion and two side portions located at two opposite sides of the middle portion, and the two side portions protrude beyond the middle portion;
wherein every adjacent two of the plurality of projections define a recession therebetween, and each said recession and the sleeve member define a gap therebetween; a distance with which each of the plurality of projections is embedded radially within the sleeve member is smaller than or equal to one half a thickness of the inner circumferential wall of the sleeve member;
wherein a difference of an outer diametric dimension of the seat and an inner diametric dimension of the sleeve member is 0.05 mm to 0.15 mm; the sleeve member is non-rotatable relative to the seat;
wherein an outer circumferential wall of the sleeve member includes at least one embossing portion; the inner circumferential wall of the sleeve member includes a guiding portion adjacent to an opening of the sleeve member; the seat is made of steel; and the sleeve member is made of aluminum alloy.

* * * * *